United States Patent [19]

Slifkin

[11] Patent Number: 4,885,035
[45] Date of Patent: Dec. 5, 1989

[54] METHOD OF CRYSTALLIZATION OF HONEY

[75] Inventor: Malcolm Slifkin, Pittsburgh, Pa.

[73] Assignee: Himmelrich and Company, Deerfield Beach, Fla.

[21] Appl. No.: 302,135

[22] Filed: Jan. 26, 1989

Related U.S. Application Data

[63] Continuation-in-part of Ser. No. 139,804, Dec. 30, 1987, abandoned.

[51] Int. Cl.⁴ .............................................. C13F 1/02
[52] U.S. Cl. ..................................... 127/58; 426/658; 426/385; 34/5
[58] Field of Search ................. 127/58; 426/658, 385; 34/5

[56] References Cited

U.S. PATENT DOCUMENTS

| | | | |
|---|---|---|---|
| 1,362,869 | 12/1920 | Johnson | 99/146 |
| 2,871,129 | 1/1959 | Golinelli | 99/146 |
| 3,244,528 | 4/1966 | Torr | 99/56 |
| 4,472,450 | 9/1984 | Platt, Jr. et al. | 127/58 |
| 4,540,594 | 9/1985 | Schanze | 426/658 |

Primary Examiner—H. M. S. Sneed
Assistant Examiner—Chung K. Pak
Attorney, Agent, or Firm—Oltman and Flynn

[57] ABSTRACT

Method for crystallization of a water and honey mixture by means of lyophilizing apparatus, having a honey-water mixture container, including the steps of preparing the mixture of honey and water; placing the mixture in the container; vibrating it in the container until the mixture is homogeneous; lyophilizing the homogeneous mixture of honey and water and finally removing the freeze-dried honey from the container.

1 Claim, 1 Drawing Sheet

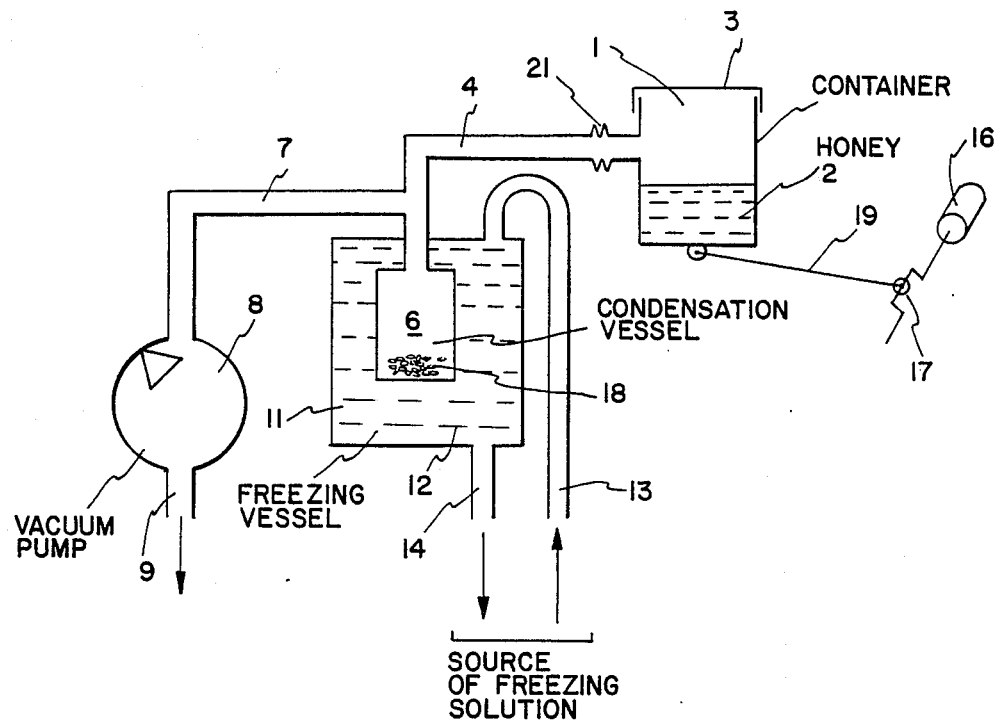

METHOD OF CRYSTALLIZATION OF HONEY

This application is a continuation-in-part of application Ser. No. 139,804, filed Dec. 30, 1987, now abandoned.

The instant invention relates to a method of crystallization of honey products for ultimate end use, and more particularly crystallizing the honey by means of freeze-drying.

BACKGROUND AND PRIOR ART

Honey is a well known nutritional product obtained from honey bees. As it is being commercially distributed, it usually contains a small amount of water. During storage, various constituents of the honey settle out and crystallize, resulting in a non-homogeneous, less than satisfactory product. Especially when the product is distributed in glass containers, the sedimentation of the layers is seen through the glass and presents a less attractive appearance. Also, the quality of the product is considered to be less desirable when it has been partially or fully settled. Various methods have been sought to overcome this problem. It is known, for example, to let honey crystallize by letting its natural content of water evaporate, leaving behind a cake of crystallized honey. Such a product can be packed and shipped, and reconstituted by adding water, and by stirring and kneading, reconstituted to its original consistency. This process however, is slow and cumbersome, and the reconstituted produce lacks the fragrance and flavor of the natural product due to the loss of volatile esters that are part of the natural honey product.

SUMMARY OF THE INVENTION

In order to overcome the problems of preserving honey described hereinabove the instant invention discloses a method which leads to a honey derivative product, in the following called the crystallized honey product, which has the advantages that raw honey can be transformed into crystallized honey that is readily and quickly returned to its natural state by adding water, which is quickly reabsorbed into the crystallized state. Further still the reconstituted product has suffered less loss of fragrance and flavor than by the known method and in addition the crystallized product is readily transportable and storable since it has a consistency of a relatively solid, yet porous product.

In accordance with the invention, the method of crystallizing honey involves the following steps, which include the use of lyophilizing apparatus for freeze drying of the honey, and a honey container with an airtight cover for containing the honey, connected to the lyophilizing apparatus. The method includes the steps of: adding four to six parts of sterile distilled water to the honey, mixing the honey and the water thoroughly by stirring, kneading, shaking or any other suitable manner for a length of time such that the mixture is thoroughly homogenized; lyophilizing the water-honey mixture in the container until substantially all the water is removed from the mixture, and finally removing the remaining crystallized honey product from the container.

Due to the rapid removal of the water in the mixture the crystallized honey product has lost only a small amount of the original flavor and fragrance, and has a porous consistency. By again adding water, the water is quickly absorbed in the pores and the sugar in the honey is quickly dissolved, resulting in a water-honey solution that is closely related to the original raw or refined honey.

Further objects and advantages of this invention will be apparent from the following detailed description of a presently preferred embodiment which is illustrated diagrammatically in the accompanying drawing.

BRIEF DESCRIPTION OF THE DRAWING

The single FIGURE is a diagrammatic block diagram of a lyophilizing apparatus, adapted for the freeze-drying of honey, showing its main components and their interconnections.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

In the single FIGURE of the drawing a container 1 for containing the honey to be lyophilized or freeze dried, shown as viscous liquid 2 which may be raw or refined honey mixed with distilled water. The container 1 has an air tight lid 3 for entering the honey and removing the crystallized product after the freeze-drying process is completed. The container 1 is connected by a pipe 4 to a condensation vessel 6 and by a pipe 7 to a vacuum pump 8, which may be any suitable type of vacuum pump such as a vane, piston, gerotor or other type of pump. The pump 8 is connected through an exhaust pipe 9 to the atmosphere.

The condensation vessel 6 is immersed in a freezing vessel 11, containing a freezing solution 12 being pumped through inlet pipe 13, through the freezing vessel 11 and the outlet pipe 14. The pipes 13 and 14 are connected to a source of freezing solution having a heat exchanger connected to a cooling apparatus of any suitable construction, which is not shown. The freezing solution may be any suitable fluid capable of operating at temperatures below freezing, such as salt water, glycol, methanol or the like.

In operation, honey mixed with sterile distilled water in the ratio of typically 4 to 6 parts of water to one part of honey. The ratio of the water-honey mixture is not critical, but the ratio shown has been found to provide satisfactory results. The water-honey mixture may be prepared outside the container 1 or in the container.

A vibrating device 17 in the form of a rotating crank 17 connected to a motor 16 and the container 1 via a link 19, may be provided to thoroughly vibrate the container 1 and mix the water and honey until it has been completely homogenized. After mixing the water and honey, the freezing solution 12 is pumped through the freezing vessel 11, thereby cooling the walls of the condensation vessel 6 to a low temperature typically in the range of −80 to −15 degrees centigrade and the vacuum pump 8 is started to develop a vacuum typically in the range of 300–700 millimicrons in the container 1 and vessel 6. As a result water vapor is drawn from the water-honey mixture in the container 1 by sublimation of the water in the honey, and comes to rest as water crystals, i.e. ice particles 18 at the bottom of the condensation vessel 6. This lyophilizing of the homogenized water-honey mixture is performed without previously deproteinizing, filtering and depigmenting this mixture.

As a result of the process, the water in the honey is drawn at a rapid rate from the water-honey mixture 2 until only a small amount of water, typically 1–4% or less remains, and the processed freeze-dried honey product takes the form of a porous relatively dry material, that can be readily formed, cut and packed in its dry form, and later reconstituted to its original state of liquid honey by adding water. The freeze-dried honey product when protected against moisture can be stored for long times without suffering any changes in composition and texture.

I claim:

1. A method of producing crystallized, porous, substantially dry honey from honey which comprises the steps of: mixing honey with distilled water to obtain a honey-water mixtures;

placing said honey-water mixture in an air-tight container which above the level of said mixture is in fluid communication with a condensation vessel; homogenizing said honey-water mixture with a vibrating means in said container to obtain a homogenized mixture: cooling said condensation vessel to a temperature substantially in the range from −80° C. to −15° C.;

passing said homogenized mixture to said condensation vessel; and, without deproteinizing, filtering or pigmenting said homogenized mixture in said container, applying vacuum to said cooled condensation vessel to remove water from said homogenized mixture in said container into said condensation vessel and to convert said homogenized mixture in said container to crystallized, porous honey containing not more than substantially 4% water.

* * * * *